United States Patent
Havelka et al.

(10) Patent No.: US 10,178,107 B2
(45) Date of Patent: Jan. 8, 2019

(54) DETECTION OF MALICIOUS DOMAINS USING RECURRING PATTERNS IN DOMAIN NAMES

(71) Applicant: Cisco Technology, Inc., San Jose, CA (US)

(72) Inventors: Jiří Havelka, Rudná (CZ); Michal Sofka, Prague (CZ); Martin Rehák, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 15/091,705

(22) Filed: Apr. 6, 2016

(65) Prior Publication Data

US 2017/0295187 A1    Oct. 12, 2017

(51) Int. Cl.
*H04L 29/06* (2006.01)

(52) U.S. Cl.
CPC ...... *H04L 63/1408* (2013.01); *H04L 63/1483* (2013.01)

(58) Field of Classification Search
CPC .............. H04L 63/14; H04L 2463/144; H04L 2463/146; H04L 29/06877; H04L 61/3015
See application file for complete search history.

(56) References Cited

U.S. PATENT DOCUMENTS

2016/0057165 A1* 2/2016 Thakar .................... G06F 21/56
                                                          726/24
2017/0134397 A1* 5/2017 Dennison .............. H04L 63/145

OTHER PUBLICATIONS

"Carbanak Apt the Great Bank Robbery", Version 2.1, Feb. 2015, 39 pages, https://securelist.com/files/2015/02/Carbanak_APT_eng.pdf, Kaspersky Lab, Moscow, Russia.
"Darkhotel Indicators of Compromise", Version 1.1, Nov. 2014, 74 pages, http://cdn.securelist.com/files/2014/11/darkhotelappendixindicators_kl.pdf, Global Research and Analysis Team, Kaspersky Lab, Moscow, Russia.
Concklin, et al., "Bad Browser Plug-ins Gone Wild: Malvertising, Data Exfiltration, and Malware, Oh My!", Threat Research, Cicso Blogs, Feb. 2015, 11 pages, http://blogs.cisco.com/security/talos/bad-browser-plug-ins.
Kruse, Peter, "The Rovnix Reincarnation", CSIS Security Group, Oct. 2014, 3 pages, https://www.csis.dk/en/csis/contact/, Copenhagen, Denmark.
Kun, Jeremy, "Word Segmentation, or Makingsenseofthis", Jan. 2012, 16 pages, http://jeremykun.com/2012/01/15/word-segmentation/.

(Continued)

*Primary Examiner* — Izunna Okeke
(74) *Attorney, Agent, or Firm* — Parker Ibrahim & Berg LLP; James M. Behmke; Stephen D. LeBarron

(57) ABSTRACT

In one embodiment, a security device identifies, from monitored network traffic of one or more users, one or more suspicious domain names as candidate domains, the one or more suspicious domain names identified based on an occurrence of linguistic units used in discovered domain names within the monitored network traffic. The security device may then determine one or more features of the candidate domains, and confirms certain domains of the candidate domains as malicious domains using a parameterized classifier against the one or more features.

25 Claims, 8 Drawing Sheets

(56) References Cited

OTHER PUBLICATIONS

Norvig, Peter, "Natural Language Corpus Data: Beautiful Data", Nov. 2011, 2 pages, http://norvig.com/ngrams/.

Wang, et al., "Breaking Bad: Detecting Malicious Domains Using Word Segmentation", In Proceedings of the 9th Workshop on Web 2.0 Security and Privacy (W2SP) 2015, Jun. 2015, 7 pages, arXiv:1506.04111 </abs/1506.04111>.

Yadav, et al., "Detecting Algorithmically Generated Domain-Flux Attacks with DNS Traffic Analysis", IEEE/ACM Transactions on Networking, vol. 20, Issue 5, Feb. 2012, 15 pages, http://ee.tamu.edu/~reddy/papers/tnet12.pdf.

* cited by examiner

Confirmed click fraud:
lendingrequestnetwork.com, lendingrequestselect.com, lendingrequestdept.com, fundingrequestapplicant.com, loanrequestnetwork.com, fundingrequestsubmission.com, loanrequestdept.com Confirmed ad-injector adware:
plahost.com wehostme.com, centahost.com, uwehost.com Confirmed ad-injector adware:
winnering.info, winnerical.com, winnership.info, winnershed.info, winnermore.info, winneri.info, winnered.org, winnerical.net, winnered.info, winnering.org, winnerica.org, winnermore.com, winnermore.net, winnering.net, winnerican.org Confirmed ad-injector adware:
lovening.info, lovezhsky.net, lovek.info, lovezhsky.com, lovezhsky.org, lovement.info, loveci.info, lovezhsky.info Confirmed adware:
infostatsserv.com, newstatsdatanet.com, newstatsclientcloud.com, newstatsdemosrv.com, staticclientstorage.com, newstaticclientstack.com, ourstaticdatastorage.com, staticinputserv.com, ourstatsstaticstack.com

FIG. 6

DETECTION OF MALICIOUS DOMAINS USING RECURRING PATTERNS IN DOMAIN NAMES

TECHNICAL FIELD

The present disclosure relates generally to computer networks, and, more particularly, to detection of malicious domains using recurring patterns in domain names.

BACKGROUND

Malicious botnets are one of the most potent threats to networking systems. To create malicious botnets, malware often utilizes a Domain Generation Algorithm (DGA) to generate domain names. In the phase of establishing the botnet, the malware employs the DGA generated domain name to establish a network communication with a Command & Control (C&C) server that is used by a botnet's originator (or "bot master") to control the botnet entities (bots) remotely. The use of the DGA makes it difficult to uncover the C&C server since the DGA can generate many domains, with only a (frequently changing) subset being registered and employed. Once a malicious botnet is established, the malicious botnet may deploy a platform for performing malicious activities such as denial-of-service (DoS) attacks, information gathering, distributed computing, cyber fraud, malware distribution, unsolicited marketing, etc.

Since typically generated domain names are unusual, they are therefore easy to identify by a network administrator or sophisticated automated detection systems (e.g., using statistical features). In reaction to the advances in network intrusion detection systems, malicious actors have started using domain names that appear legitimate. In particular, they still rely on DGAs, but maintain a dictionary of words or other linguistic units (such as syllables and meaningful units including roots, stems, prefixes, suffixes, etc.) from natural language, generating the domains by concatenating various such units, sometimes also with acronyms, abbreviations, neologisms, numbers and other characters.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example of results that may be obtained using algorithms for detection of malicious domains using recurring patterns in domain names.

DESCRIPTION OF EXAMPLE EMBODIMENTS

Overview

According to one or more embodiments of the disclosure, a security device identifies, from monitored network traffic of one or more users, one or more suspicious domain names as candidate domains, the one or more suspicious domain names identified based on an occurrence of linguistic units used in discovered domain names within the monitored network traffic. The security device may then determine one or more features of the candidate domains, and confirms certain domains of the candidate domains as malicious domains using a parameterized classifier against the one or more features.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links.

Figure 1A:
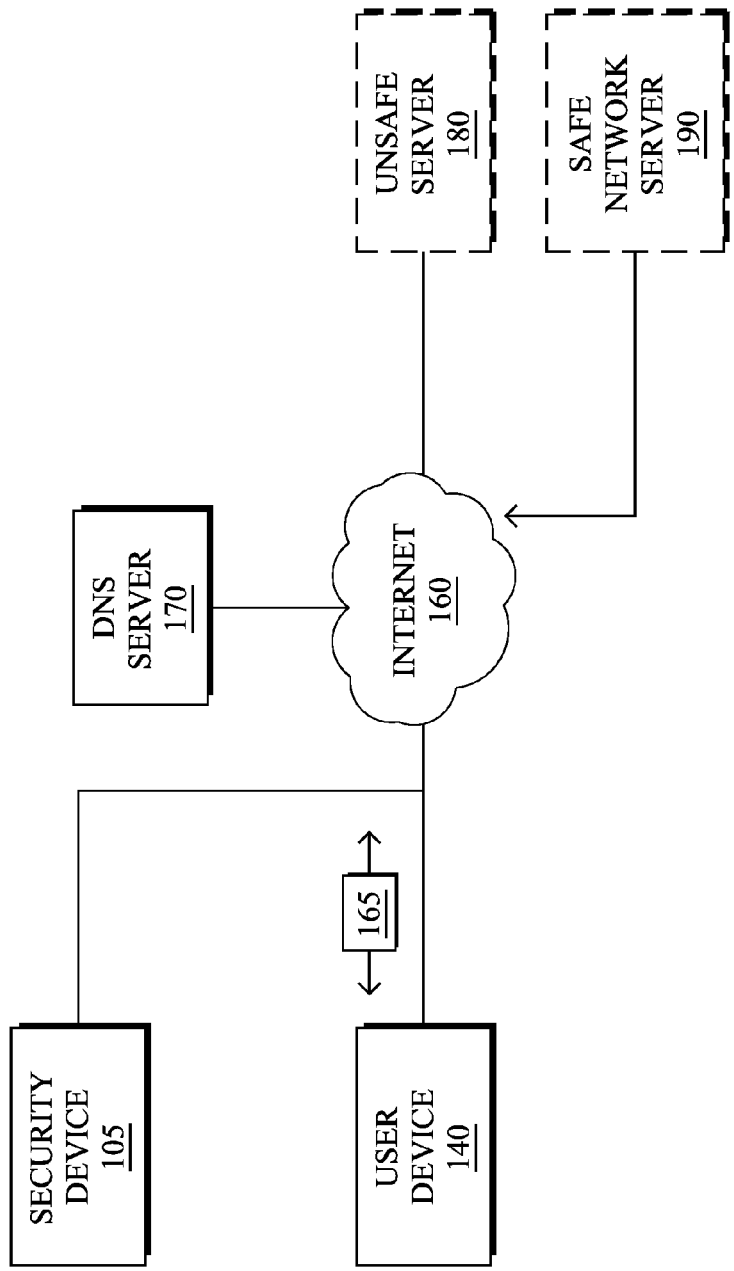
FIG. 1A illustrates an example computer network.

FIG. 1A is a simplified block diagram of an example computer network 100, showing a security device 105 interconnected via a computer network (e.g., Internet) 160 to a variety of devices. In particular, one or more user devices 140 may be connected to the network 160 (e.g., directly or via a proxy). Further, one or more servers may also be connected to the network 160, such as an unsafe server 180, a safe server 190, and other servers, such as domain name servers (DNS) 170. Data packets 165 (e.g., traffic and/or messages sent between the devices) may be exchanged among the devices of the computer network 100 using predefined network communication protocols. In this context, a protocol consists of a set of rules defining how the nodes interact with each other. Those skilled in the art will understand that any number of devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
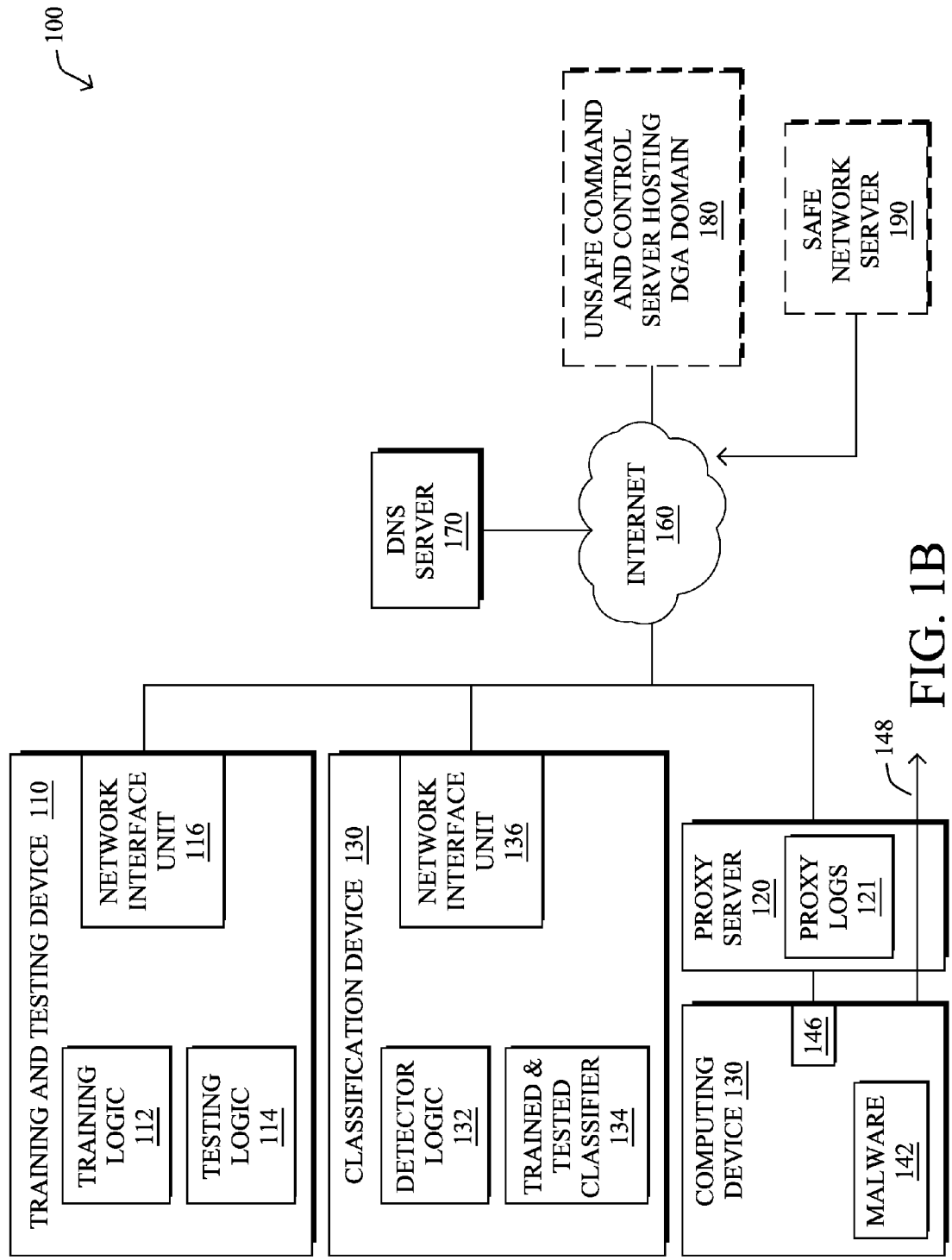
FIG. 1B illustrates an alternative view of the example computer network.

In addition, FIG. 1B is a schematic block diagram of an alternative view of the example computer network (networking system) 100, in which the techniques presented herein may be employed. In particular, in one embodiment, networking system 100 may illustrate the security device 105 as a separate training and testing device 110 and a classification device 130. Training logic 112 and testing logic 114 reside and are executed on the training and testing device. Training and testing device 110 may be connected to proxy server 120 via network interface unit 116 (e.g., a network interface card). FIG. 1B further shows the classification device 130 on which detector logic 132 resides and is executed utilizing trained and tested classifier 134. Classification device 130 may also be connected to proxy server 120 via network interface unit 136. The proxy server 120 stores proxy logs 121 of network communications to Internet 160 that are established via proxy server 120. Networking system 100 also includes computing device 140 on which malware 142 resides and is executed. Computing device 140 is connected to proxy server 120 via network interface unit 146. Proxy Server 120 connects computing device 140 to Internet 160. In FIG. 1B, for simplicity, only computing device 140 is connected to Internet 160 via proxy server 120. However, computing device 140 may be, for example, part of an enterprise network (not shown), and the enterprise network may include, but is not limited to, a plurality of computing devices, servers and other network devices that may be infected by malware. In addition, several network elements may be connected to Internet 160 such as DNS server 170, unsafe Command & Control (C&C) server 180 hosting a Domain Generation Algorithm (DGA) domain and safe network server 190 that may host one or more safe non-DGA generated domains. In addition, detector logic 132 together with trained and tested classifier 134 may also reside on computing device 140 (e.g., as a security process on device 140).

Notably, FIG. 1B shows an attempt of computing device 140 to establish network communication 148 that is triggered by malware 142. Network connection 148 initiated by computing device 140 may be an attempt by malware 142 to communicate with unsafe C&C server 180. As used herein, malware 142 refers to an executable file that causes a computer/processor to execute instructions, and the malware may be in a machine language, interpreted language, intermediate language, script language or any other language now known or hereinafter developed that causes a computer/processor to execute instructions.

Figure 2:
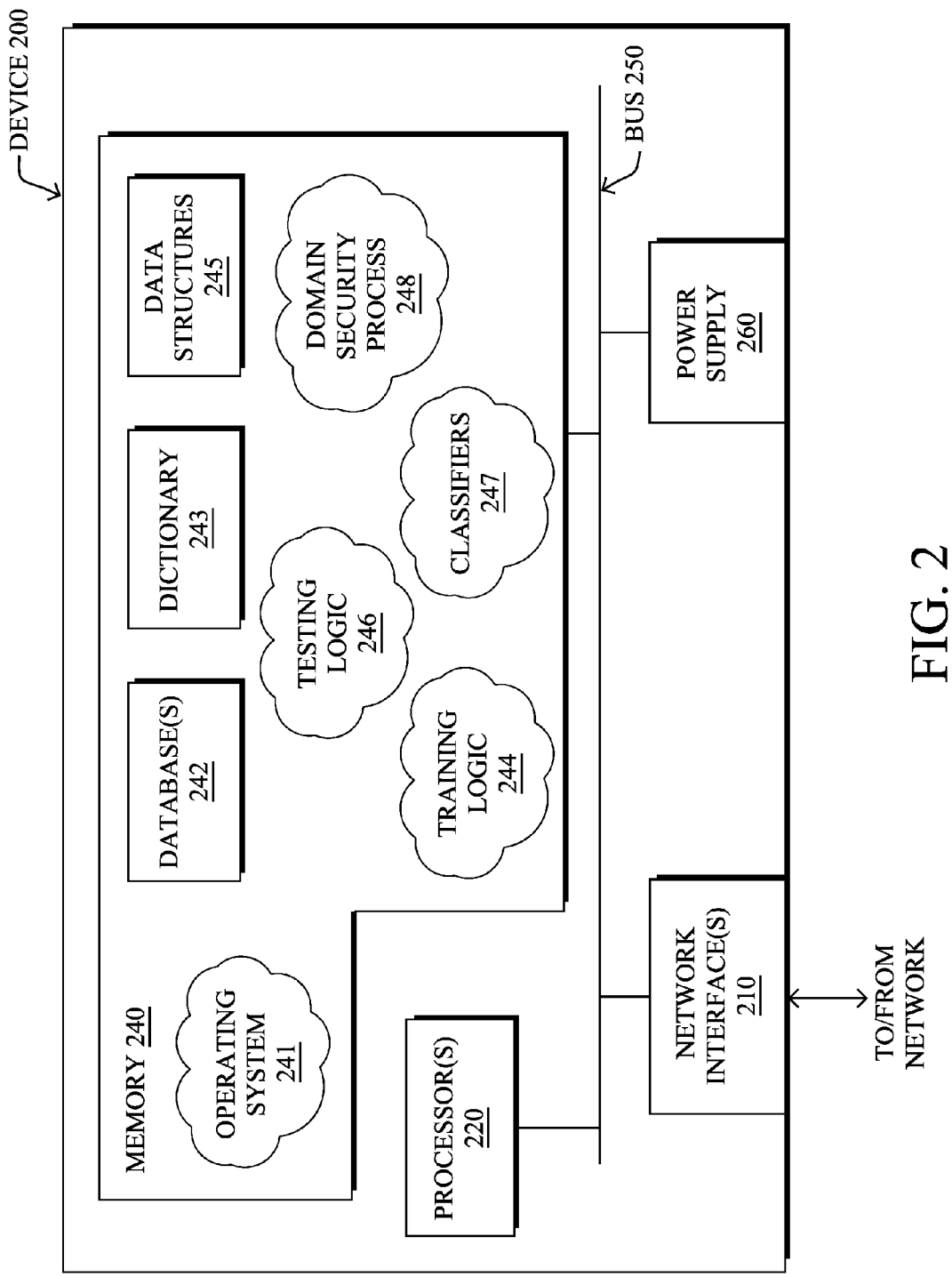
FIG. 2 illustrates an example security device.

FIG. 2 is a schematic block diagram of an example device 200 that may be used with one or more embodiments described herein, e.g., as the security device 105 (or as training and testing device 110 and/or classification device 130) of FIGS. 1A-1B above. The device may comprise one or more network interfaces 210, at least one processor 220, and a memory 240 interconnected by a system bus 250, as well as a power supply 260.

The network interface(s) 210 contain the mechanical, electrical, and signaling circuitry for communicating data over links coupled to the network 100. The network interfaces may be configured to transmit and/or receive data using a variety of different communication protocols. The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a "domain security" process 248, as described herein, which may coordinate with various databases 242, dictionary(ies) 243, training logic 244, testing logic 246, and classifiers 247.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, to create malicious botnets, malware often utilizes a Domain Generation Algorithm (DGA) to generate domain names, and the use of the DGA makes it difficult to uncover a Command & Control (C&C) server since the DGA can generate many domains, with only a (frequently changing) subset being registered and employed. As also noted above, in reaction to the advances in network intrusion detection systems, malicious actors have started using domain names that appear legitimate. In particular, they still rely on DGAs, but maintain a dictionary of words from natural language, generating the domains by concatenating various words, sometimes with acronyms, abbreviations, neologisms, numbers and other characters. Other techniques that have attempted to address this problem simply compute basic features such as number of hyphens, digits, characters, and numbers from domain names in order to detect DGAs and possible malicious domains.

The techniques herein, therefore, propose embodiments that detect these malicious domains, and that do so without requiring prior knowledge of malicious domains. In particular, since malicious domain names that appear to look legitimate might be formed using a DGA that employs natural language units (e.g., words, abbreviations, neologisms, etc.), the techniques herein propose to identify these domains in a two-step system. First, suspicious domain name candidates may be identified by finding common words (or linguistic units, generally) in domains of a user communication within a time window. Next, the candidates are then confirmed through various classifications, such as based on computing statistics of the network communication, using registration records, correlating requests to suspicious domains, or correlating user behaviors on a local network.

Said differently, according to one or more embodiments of the disclosure as described in detail below, a security device identifies, from monitored network traffic of one or more users, one or more suspicious domain names as candidate domains, the one or more suspicious domain names identified based on an occurrence of linguistic units used in discovered domain names within the monitored network traffic. The security device may then determine one or more features of the candidate domains, and confirms certain domains of the candidate domains as malicious domains using a parameterized classifier against the one or more features.

Illustratively, the techniques described herein may be performed by hardware, software, and/or firmware, such as in accordance with the "domain security" process 248, which may contain computer executable instructions executed by the processor 220 to perform functions relating to the techniques described herein. For example, the techniques herein may be treated as extensions to conventional domain monitoring processes, such as malware detection, firewalling, denial of service (DoS) attack prevention, etc., and as such, may be processed by similar components on security devices or devices with security features that are understood in the art to execute those protocols, accordingly.

Operationally, the techniques assume the existence of malicious domain names that attempt to look legitimate by being formed using natural language linguistic units (e.g., words, abbreviations, neologisms, etc.) Such domain names are referred to herein as "word-based domain names/domains". Word-based domain names may generally be created using words from a list of words (also referred to as a dictionary), which can be obtained from some publicly available text file or compiled by some other means. Typically, a word-based domain name is obtained by concatenating several natural language words. In the case of a generation algorithm, the lengths of produced strings are typically restricted into some interval.

Notably, the formulations herein are not limited to "words" in the commonly understood sense, but rather may be applied to linguistic units in general, such as words, syllables, and other linguistic units carrying some sort of significance and/or meaning. For instance, minimal meaningful units are called morphemes in linguistics, and generally correspond to syllables; morphemes include, for example, word roots, prefixes, and suffixes. Said differently, the techniques herein are directed to any kind of units that combined together (e.g., using relatively simple means) give rise to strings having the appearance of coming from a natural language (e.g., both to humans and computer algorithms for detecting whether a string comes from some natural language). Though generally such units are larger than single letters, there are notably single-letter morphemes/syllables, for example in English "I" and "a", etc. The techniques herein, however, are differentiated from methods that merely look at combinations of individual letters, since the techniques herein look at linguistic units that carry some significance and/or meaning, as mentioned above. Accordingly, the techniques herein may be based on a dictionary of all linguistic units whose combination could give rise to natural language-like strings, which may be nonsensical, but may superficially resemble natural language well. (In particular, malicious domains have been observed that were created using such syllable-like units, looking as if they were created using natural language words on the level of single characters (e.g., frequencies of single characters, pairs of adjacent characters, etc.).) As such, any use of the term "word" herein may generally imply any linguistic unit that fits this description, and is not limited merely to words with defined linguistic meanings. Accordingly, the terms "word" and "linguistic unit" may be used interchangeably herein, unless otherwise specifically differentiated, and generally infer a level of significance and/or meaning (also referred to as a "significant linguistic unit" or "linguistic unit of significance").

The simplest way of creating a word-based (linguistic-unit-based) domain name is to concatenate pseudo-randomly selected items in the dictionary so that the length of the resulting concatenated string lies in some predefined interval. Very short words (typically up to a length of three characters) are not used so as to avoid substrings that would not be easily recognizable as natural language words (these might result from a random concatenation of several very short words). A more sophisticated way of generating word-based domains, however, is to mimic the linguistic structure of natural language, even if only superficially. An example of such an algorithm uses predefined lists of nouns and verbs and creates domain names using the noun-verb-noun-verb pattern.

Figure 3:
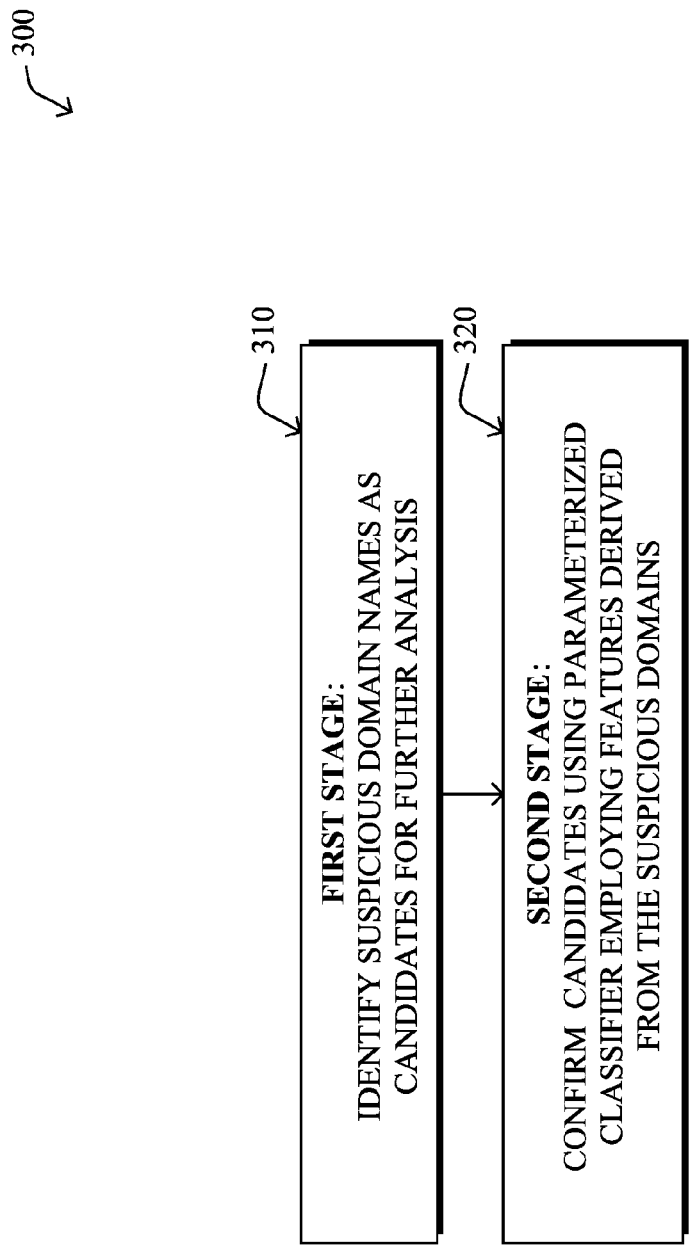
FIG. 3 illustrates an example staged approach to detection of malicious domains using recurring patterns in domain names.

According to the techniques herein, therefore, detection of domain names generated using dictionaries may be performed in two basic stages, as shown in the flowchart 300 of FIG. 3. In a first stage (310), suspicious domain names are identified as candidates for further analysis. Then, in a second stage (320), the candidates are confirmed using a robust parameterized classifier employing robust features derived from suspicious domains obtained in the first step.

Regarding generating suspicious domain name candidates, according to the techniques herein, domain names can be broken into parts corresponding to linguistic units/words in some natural language using a generic algorithm. The problem of token extraction is studied in the field of Natural Language Processing (NLP). Tokens of interest can be extracted using multiple techniques, for example using simple keyword spotting (determining whether keywords of interest occur in a string) or segmentation of the input string into linguistic units. The problem of segmenting a sequence of linguistic items into linguistically well-defined subsequences is also studied in NLP. In the case of word-based domains, the relevant techniques want to find the most likely segmentation(s) of the domain name (a sequence of characters) into its linguistic constituent parts (subsequences of characters), corresponding to natural language words that a human can recognize in the domain name, and possibly unintelligible sequences of characters. A prerequisite for such an automatic segmentation is a list of words whose presence in a domain name we would like to ascertain; the present disclosure refers to such a list as a "segmentation dictionary" (e.g., dictionary 243). Notably, the techniques herein are not dependent on any particular way of obtaining tokens (words) present in a domain name. Accordingly, the formulations mentioned herein (e.g., a segmentation approach using dynamic programming to obtain tokens of interest) are merely example implementations, and are not meant to limit the scope of the embodiments herein.

The task of segmenting a domain name would be made easier if the dictionary used to generate a set of word-based domains was known. This will generally not be the case, but given that the techniques herein are interested in detecting human-intelligible word-based domains, a large generic segmentation dictionary will include with high probability all or most words from any generation dictionary, even those unknown, that was used to generate some set of word-based domains. Domain names can also be formed using words from various natural languages, even using multiple natural languages in one domain name. NLP techniques may be used herein to deal even with such cases, accordingly.

According to the techniques herein, given a domain name string (representing a domain name or its part delimited by characters such as dashes), its best segmentation may be determined using dynamic programming. To score possible segmentations, the techniques herein may use relative frequencies of linguistic units/words in the segmentation dictionary, with which the units/words appear in natural language, and a per-character penalty for substrings not appearing in the segmentation dictionary (note that the frequencies and per-character penalty can be estimated from publicly available corpora of natural language text).

According to one or more embodiments herein, the techniques herein identify sets of suspicious word-based domain names, generally based on the co-occurrence of words and substrings in the domain names. In particular, the techniques herein assume that several different malicious word-based domains are used together in a campaign.

Figure 4:
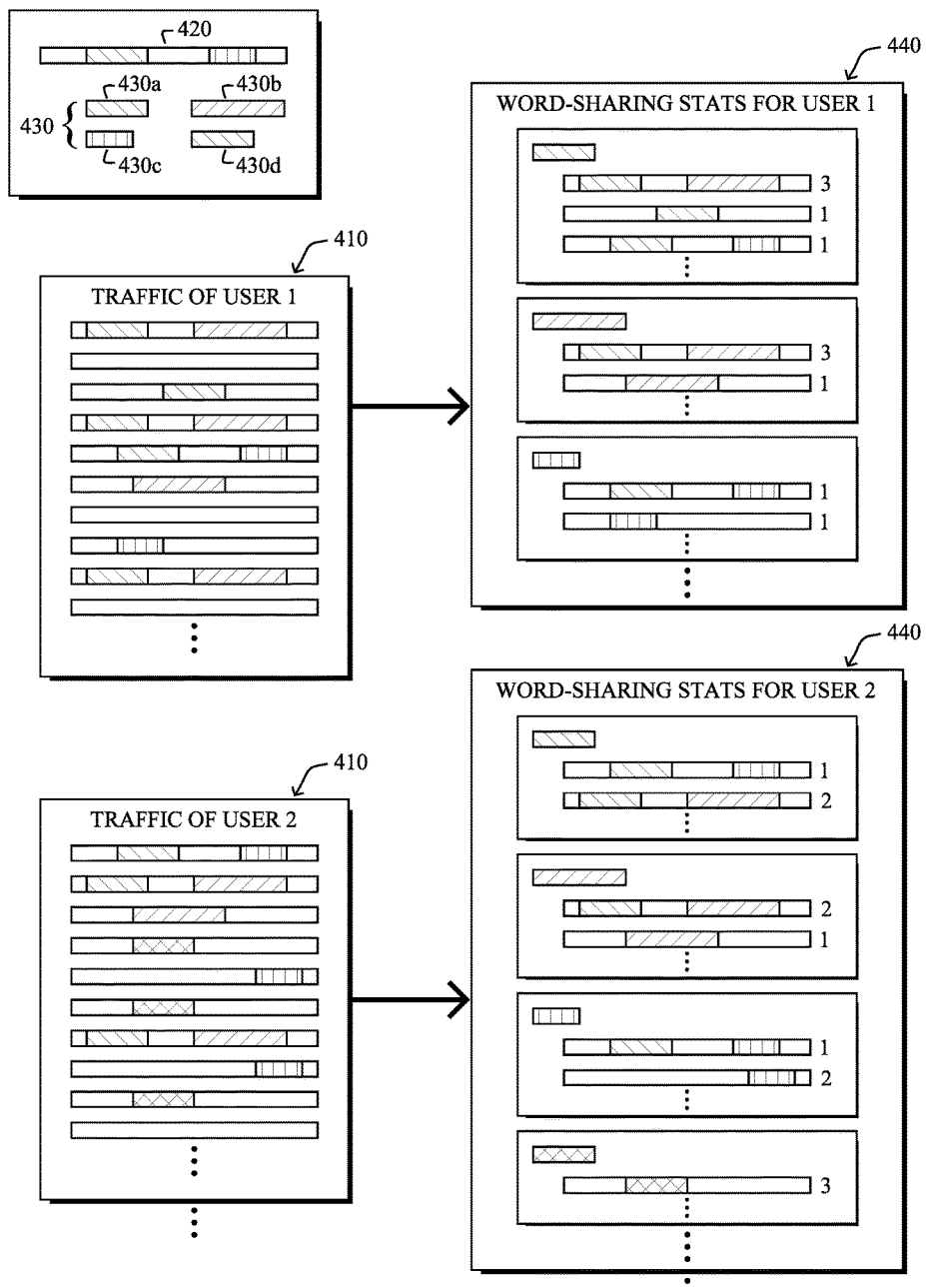
FIG. 4 illustrates an example of computing word statistics of shared words in word-based domains of analyzed traffic of one or more users.

With reference generally to FIG. 4, illustrating computation of word statistics using shared words in word-based domains, by analyzing the traffic 410 of a user or a group of users in some time window (typically hours), sets of domains 420 in the traffic sharing common words 430 can be determined (sets 440). That is, the techniques herein determine such sets of domains suspicious based on the presence of one or more shared words 430 (430a, 430b, 430c, and 430d) among the domains. Note that the techniques herein may disregard from further consideration a small set of words that appear frequently and do not carry discriminative information (such as "cdn"); the disregarded words correspond to "stop words" as used in Natural Language Processing.

The techniques herein create such sets of suspicious domains also based on their sharing substrings found during segmentation that do not correspond to words in the known segmentation dictionary 243. For instance, if a non-word substring is shared by a substantial number of domain names, it may represent a new word to be added to the segmentation dictionary. This technique helps enlarge the dictionary in order to account for new words, character swapping or bit swapping (e.g., replacing an alphabetic "l" (lower-case L) with a numeric "1" (one)), using other alphabets (e.g., Greek), as well as Unicode or other techniques as may be appreciated by those skilled in the art.

Along with the information about the segmentations of domain names, the techniques herein can also count how many times a user accessed individual domains.

Words in a segmentation dictionary may be weighted by a score representing how likely they are associated with a malicious domains (for example, "search" could be associated with malicious domains pretending to be search engines). Such weights can be used to score candidate sets of suspicious domains determined as above.

The information obtained as described above can be used to determine candidate suspicious word-based domains. According to the techniques herein, candidate domains exhibit some or all of the following characteristics:

domains sharing a common word form a substantial proportion of domains accessed by a user/group of users;

traffic to domains sharing a common word forms a substantial proportion of traffic generated by a user/group of users;

a set of domains sharing a common word co-occurs across some number of users, and such co-occurrence across users is unlikely given the traffic of all users; and sets of domains sharing common words exhibit a relationship between the words in the domain names (for example, domains containing "sale" and names of fashion articles—note that the relationship can be linguistic/grammatic (e.g., such as between words in a clause, between synonyms and antonyms, hyponyms and hyperonyms, etc.), or "extra-linguistic" (e.g., where the words may come from some arbitrary pre-existing text, such as, for example, where the words do not exhibit verb-object or other grammatical relationships, but only the fact they occurred in some given text)).

To be able to ascertain the above characteristics, the techniques herein (e.g., domain security process 248) compute relevant statistics as follows:

For each user, consider the entire user's traffic within a given time window. If there is a reliable indication that some domains are not malicious (e.g. Web reputation or list of popular web sites), remove them from further processing;

For each considered domain accessed by a particular user, get cached segmentation or segment the domain name into segments of interest and:
  a) Update data structures for the user; and
  b) Increase count of accesses to domain.

For each word in segmentation, store the domain in a set of domains containing the word in their segmentations and:
  a) Update global data structures; and
  b) Cache segmentation for the domain.

To then confirm suspicious word-based domain name candidates as very likely malicious candidates, the techniques herein may use a general parameterized classifier, which employs features derived from suspicious domains obtained in the first stage described above. In particular, the features capture characteristics conducive to making a robust decision regarding maliciousness of a candidate word-based domain, and include, but are not limited to, the ones described below.

Domains sharing some word or words are referred to herein as "candidate domains." All features are calculated from sets of candidate domains, traffic to the candidate domains and overall traffic, and relevant external information about candidate domains. Features are calculated within individual sets of candidate domains for a common word for a single user, across sets of candidate domains for different shared words for a single user, and also across users.

As described below, features may be extracted for a single word shared across domains, which is directly applicable in the case when a candidate domain shares only a single word with other candidate domains. In the case a candidate domain shares multiple words with other candidate domains (there are multiple candidate domain sets that the given candidate domain belongs to), standard feature aggregation techniques can be used. Alternatively, Machine Learning techniques such as Multiple-Instance Learning can be used to train parameters of the classifier.

Feature 1) Statistically abnormal amount of communication. The following features capture the amount of communication using a set of word-based domains:

Number of domains sharing a common word with the candidate domain.

Proportion of domains sharing a common word with the candidate domain (e.g., relative to all domains in the user's traffic, all domains in the user's traffic excluding known legitimate ones, etc.).

Feature 2) Correlated registration information. Registration information for domains (e.g., WHOIS records) can be used to determine that a candidate suspicious word-based domain is likely to be malicious. The features extracted may include:

Number of candidate domains sharing the creation date with the given candidate domain.

Number of candidate domains sharing registration country with other given candidate domain.

Likelihood that domains registered in registration country for the given candidate domain are malicious (estimated using external data).

Number of candidate domains sharing the registrant with the given candidate domain.

Likelihood that the registrant of the given candidate domain is a malicious individual/organization.

Number of candidate domains sharing DNS servers with the given candidate domain.

Likelihood that DNS servers for the given domain resolve malicious domains.

Further features can be derived from the above by taking proportions and by applying any suitable standard techniques of feature combination.

Feature 3) Correlated requests to suspicious domains. The techniques herein may extract features from requests to candidate suspicious word-based domains as follows:

Given candidate domain requests share a URL pattern with requests to other candidate domains (this is in fact a feature template).

Given candidate domain requests exhibit a URL pattern known to correspond to malicious behavior (this is in fact a feature template).

Given candidate domain shares traffic pattern with other candidate domains, including but not limited to:
Numbers of uploaded bytes;
Number of downloaded bytes; and
Timings of requests.

Feature 4) Correlated user behaviors. Once the system identifies sets of suspicious domains for individual users, the techniques herein may also correlate the candidate sets across users. Features that indicate that a domain in a set of candidate suspicious word-based domains is malicious, include:

The domains in the candidate sets across users sharing a common word with the given candidate domain are significantly more likely to appear together in the traffic of users than by chance.

Substantial parts of the candidate sets for a given common word are shared by different users (in other words, candidate sets for different users have large intersection).

Figure 5:
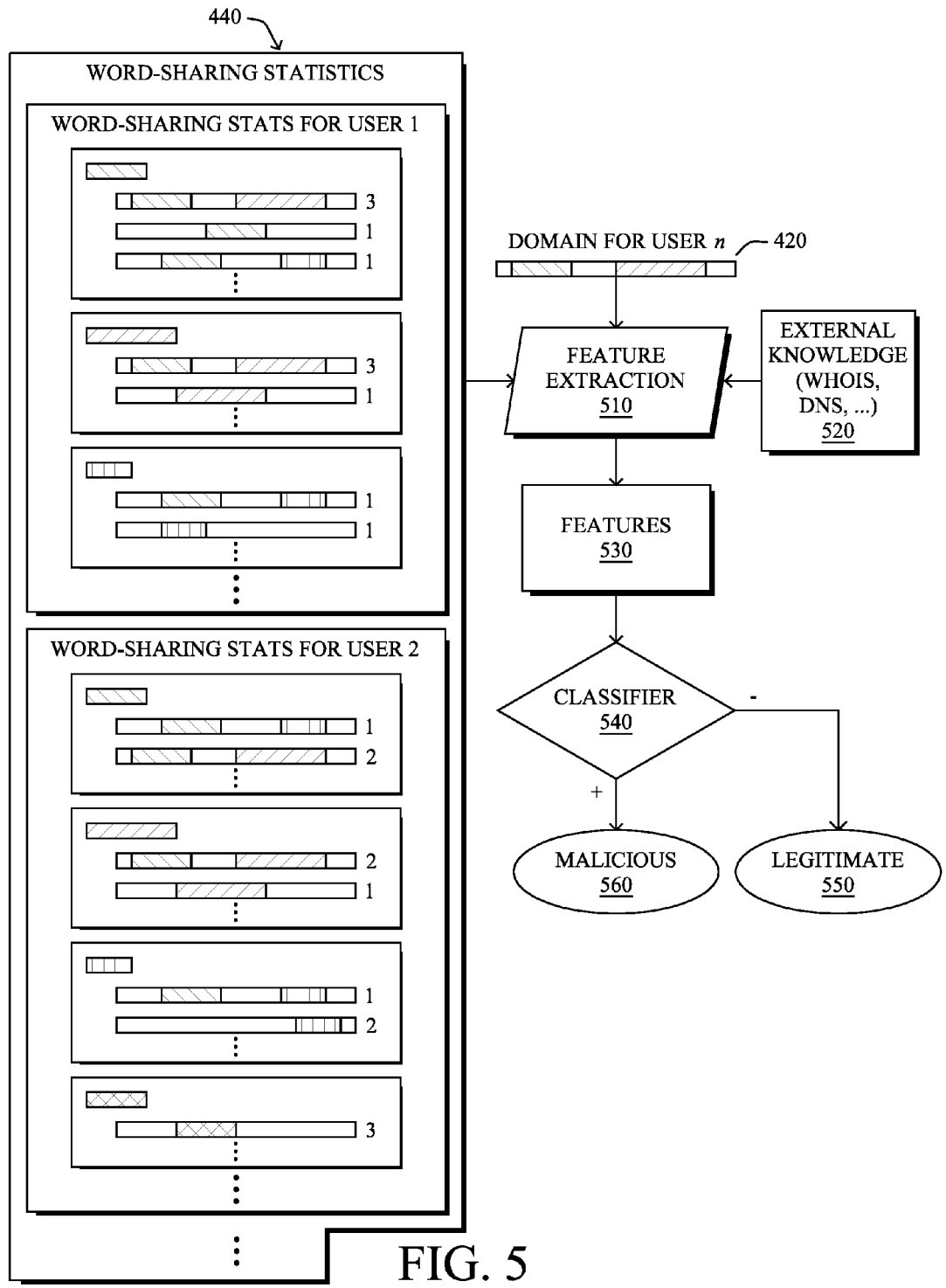
FIG. 5 illustrates an example algorithm for detection of malicious domains using recurring patterns in domain names.

According to one or more embodiments described herein, and with reference generally to FIG. 5, the system (domain security process 248) uses a parameterized classifier 247 to determine whether a candidate domain is malicious. Any parameterized classifier can be used, including but not limited to: linear classifiers, non-linear classifiers (such as neural networks, decision trees, etc.), trained using any suitable objective function and optimization method. Note that to train a parameterized classifier, training examples may be obtained iteratively based on forensic analysis of suspicious domains.

As shown in FIG. 5, illustrating a schematic diagram of an example algorithm for detection of malicious domains using recurring patterns in domain names, and as described generally above, therefore, word-sharing statistics 440 and a domain 420 for user "n" may be used as inputs to a feature extraction 510, along with external knowledge 520, such as WHOIS databases, DNS information, and so on. The extracted features 530 may then be used as inputs to a classifier 540, which can then make determinations (confirmations) as to whether a domain is legitimate (550) or malicious (560), accordingly.

FIG. 6 illustrates an example of results that may be obtained using the algorithms described herein. In particular, similar words 430 are shown with matching levels of underlining, and each of the examples under a given category (e.g., click fraud, adware, etc.) can be seen to contain a set of shared words that triggered suspicious activity, and ultimately were flagged as malicious domains, according to the techniques described herein.

Figure 7:
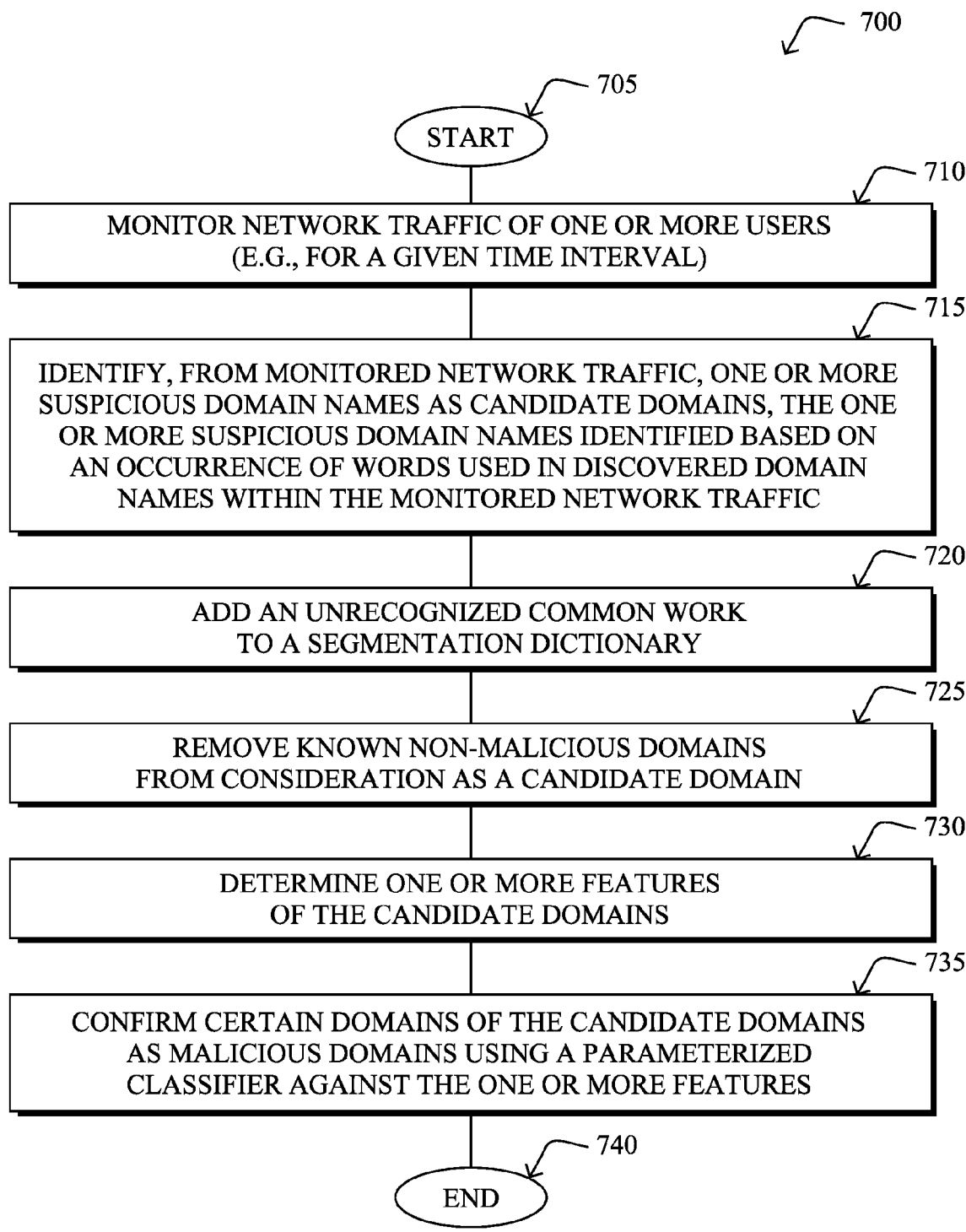
FIG. 7 illustrates an example simplified procedure for detection of malicious domains using recurring patterns in domain names.

FIG. 7 illustrates an example simplified procedure for detection of malicious domains using recurring patterns in domain names in accordance with one or more embodiments described herein. The procedure 700 may start at step 705, and continues to step 710, where, as described in greater detail above, the security device 105 (e.g., domain security process 248) monitors network traffic for one or more users, e.g., for a given time interval, or else may receive the monitored traffic, such as from a proxy device or otherwise. In step 715, the security device identifies, from the monitored network traffic, one or more suspicious domain names as candidate domains, as described above. In particular, the one or more suspicious domain names may be identified based on an occurrence of linguistic units/words used in discovered domain names within the monitored network traffic. In order to accomplish this, as detailed herein, the discovered domain names may be segmented into one or more linguistic constituent parts using natural language processing, where the one or more linguistic constituent parts correspond to human-recognizable words using a segmentation dictionary having a set of human-recognizable words in one or more languages. By determining sets of domain names sharing one or more common words, the techniques herein may thus identify the suspicious domain names based on one or more characteristics described above (e.g., domains/traffic sharing a common word, unlikely co-occurrences across users, a common word that exhibits a relationship with other words in the discovered domain names, and so on).

Note that in this process, the system may determine a common word across the discovered domain names that is unrecognized in a segmentation dictionary, such as where the occurrence of words comprises one or more words with visually representative character replacements (e.g., a letter "l" as a numeric "1", etc.). As such, in step 720, the any unrecognized common word may be added to the segmentation dictionary.

Also, in step 725, any known non-malicious domains may be removed from consideration as a candidate domain, as described above.

In step 730, the security device determines one or more features of the candidate domains in a manner as described in greater detail above. For example, any number of features may be determined, such as a number or proportion of domains sharing a common word, correlated domain registration information, correlated domain requests to other suspicious domains (e.g., shared URL patterns, malicious URL patterns, etc.), and also correlated user behaviors (e.g., a likelihood of appearance of particular domain across the users, an amount of intersection of candidate domains for each user across candidate domains of all of the one or more users, etc.). Other features may be determined in step 730, and the above list is merely an example of possible features that may be deemed useful.

Once the features have been determined, then in step 735 the system confirms certain domains of the candidate domains as malicious domains using a parameterized classifier against the one or more features. That is, the linear or non-linear classifier, which may be trained using an objective function with an optimization, makes a determination of the input domain as malicious or otherwise based on the features associated with the domain, as described herein. The simplified procedure 700 may then end in step 740, notably with the option to continue monitoring for and detecting malicious domain names.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for detection of malicious domains using recurring patterns in domain names. In particular, the techniques herein, unlike techniques that use a database of known malicious domains and basic features extracted from words to represent these domains, can in fact identify malicious domains and potential candidates without a prior database. That is, since attackers increasingly use word-based domains, the proposed solution herein is a differentiating capability for security devices (or security components of devices) to keep up with the changing landscape of attacks, particularly by treating domain names at the word-level (e.g., natural language words, possibly interspersed with sequences of characters not corresponding to existing natural language words ("nonsense" words)).

Specifically, the techniques herein do not treat the domain names as sequences of characters, but rather work with natural language words "embedded" in domain names. In particular, methods that treat the domain names as sequences of characters fail when the word-based domain generation algorithm uses large enough dictionary (so that the probabilities of individual characters in the set of generated domain names are close enough to probabilities for legitimate domains), and combines words in the dictionary so that even probabilities of adjacent characters are close enough to probabilities for legitimate domains. The techniques herein, on the other hand, are capable of detecting domains generated by a domain generation algorithm by combining natural language words and/or character patterns, provided that they are re-used in the generated domain names and the domains share some malicious characteristics.

While there have been shown and described illustrative embodiments that provide for detection of malicious domains using recurring patterns in domain names, it is to be understood that various other adaptations and modifications may be made within the spirit and scope of the embodiments herein. For example, the embodiments have been shown and described herein with relation to certain network protocols and formats. However, the embodiments in their broader sense are not as limited, and may, in fact, be used with other types of domain name address schemes or network protocols. In addition, while certain identification, feature detection, and/or classification techniques are shown, other suitable techniques may be used, accordingly. Also, it should be again noted that the use of the term "word" herein is not limited to standard dictionary entries, but rather refers to linguistic units as mentioned above. That is, a "word" herein merely represents a pattern of characters that are either human-recognizable (e.g., with character replacement/swapping as mentioned above) or else that are computer-recognizable (e.g., added dictionary entries, such as based on detected repetitive patterns as mentioned above), generally carrying some sort of significance and/or meaning (e.g., morphemes, syllables, characters superficially resembling natural language, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying, by a security device from monitored network traffic of one or more users, one or more suspicious domain names as candidate domains, the one or more suspicious domain names identified as suspicious based on a co-occurrence of domain words used in discovered domain names within the monitored network traffic;
   segmenting, by the security device, the discovered domain names into one or more linguistic constituent parts using natural language processing, the one or more linguistic constituent parts corresponding to human-recognizable words;
   determining, by the security device, sets of domain names sharing one or more common linguistic units;
   identifying, by the security device, the suspicious domain names based on one or more characteristics selected from:
      domains sharing a common linguistic unit being a substantial proportion of domains in the monitored network traffic;
      traffic to domains sharing a common linguistic unit being a substantial proportion of traffic in the monitored network traffic;
      a set of domains sharing a common linguistic unit being an unlikely co-occurrence across a set of the one or more users; and
      a set of domains sharing a common linguistic unit that exhibits a relationship between linguistic units in the discovered domain names;
   determining, by the security device, one or more features of the candidate domains; and
   confirming, by the security device, certain domains of the candidate domains as malicious domains using a parameterized classifier against the one or more features.

2. The method as in claim 1, wherein segmenting comprises:
   using a segmentation dictionary having a set of human-recognizable words in one or more languages.

3. The method as in claim 1, further comprising:
   determining a common linguistic unit across the discovered domain names, wherein the determined common linguistic unit is unrecognized in a segmentation dictionary; and
   adding the determined common linguistic unit to the segmentation dictionary.

4. The method as in claim 1, further comprising:
   monitoring the monitored network traffic for a given time interval.

5. The method as in claim 1, further comprising:
   removing known non-malicious domains from consideration as a candidate domain.

6. The method as in claim 1, wherein determining one or more features comprises:
   determining one or both of a number or proportion of domains sharing a common linguistic unit within the candidate domains.

7. The method as in claim 1, wherein determining one or more features comprises:
   determining correlated domain registration information of the candidate domains.

8. The method as in claim 7, wherein correlated domain registration information is selected from a group consisting of: similar domain creation dates; a maliciousness likelihood of a registration country; a shared registration country; a maliciousness likelihood of a registrant; a shared registrant; a maliciousness likelihood of a domain name server (DNS); and a shared DNS.

9. The method as in claim 1, wherein determining one or more features comprises:
   correlating domain uniform resource locator (URL) requests to other suspicious domains.

10. The method as in claim 9, wherein correlating comprises:
   determining existence of one or more characteristics selected from:
      a particular domain sharing a uniform resource locator (URL) pattern with other candidate domains;
      a particular domain exhibiting a URL pattern known to be malicious; and
      a particular domain sharing one or more traffic pattern characteristics with other candidate domains.

11. The method as in claim 1, wherein determining one or more features comprises:
   correlating user behaviors across the monitored traffic of the one or more users.

12. The method as in claim 11, wherein correlating comprises:
   determining existence of one or more characteristics selected from:
      a likelihood of appearance of particular domain across the one or more users; and
      an amount of intersection of candidate domains for each user across candidate domains of all of the one or more users.

13. The method as in claim 1, wherein the parameterized classifier is one of either a linear classifier or a non-linear classifier, and is trained using an objective function with an optimization.

14. The method as in claim 1, wherein the reoccurrence of linguistic units comprises one or more linguistic units with visually representative character replacements.

15. An apparatus, comprising:
   one or more network interfaces to communicate with computer network;
   a processor coupled to the network interfaces and adapted to execute one or more processes; and
   a memory configured to store a process executable by the processor, the process when executed operable to:
      identify, from monitored network traffic of one or more users, one or more suspicious domain names as candidate domains, the one or more suspicious domain names identified as suspicious based on a co-occurrence of domain words used in discovered domain names within the monitored network traffic;
      segment the discovered domain names into one or more linguistic constituent parts using natural language processing, the one or more linguistic constituent parts corresponding to human-recognizable words;
      determine sets of domain names sharing one or more common linguistic units;
      identify the suspicious domain names based on one or more characteristics selected from:
         domains sharing a common linguistic unit being a substantial proportion of domains in the monitored network traffic;
         traffic to domains sharing a common linguistic unit being a substantial proportion of traffic in the monitored network traffic;
         a set of domains sharing a common linguistic unit being an unlikely co-occurrence across a set of the one or more users; and
         a set of domains sharing a common linguistic unit that exhibits a relationship between linguistic units in the discovered domain names;
      determine one or more features of the candidate domains; and
      confirm certain domains of the candidate domains as malicious domains using a parameterized classifier against the one or more features.

16. The apparatus as in claim 15, wherein
   the human-recognizable words are identified according to a segmentation dictionary having a set of human-recognizable words in one or more languages.

17. The apparatus as in claim 15, wherein the process when executed is further operable to:
   determine a common linguistic unit across the discovered domain names, wherein the determined common linguistic unit is unrecognized in a segmentation dictionary; and
   add the determined common linguistic unit to the segmentation dictionary.

18. The apparatus as in claim 15, wherein the process when executed to determine one or more features is further operable to:
   determine one or both of a number or proportion of domains sharing a common linguistic unit within the candidate domains.

19. The apparatus as in claim 15, wherein the process when executed to determine one or more features is further operable to:
   determine correlated domain registration information of the candidate domains.

20. The apparatus as in claim 15, wherein the process when executed to determine one or more features is further operable to:
   correlate domain uniform resource locator (URL) requests to other suspicious domains.

21. The apparatus as in claim 15, wherein the process when executed to determine one or more features is further operable to:
   correlate user behaviors across the monitored traffic of the one or more users.

22. A tangible, non-transitory, computer-readable media having software encoded thereon, the software when executed by a processor operable to:
   identify, from monitored network traffic of one or more users, one or more suspicious domain names as candidate domains, the one or more suspicious domain names identified as suspicious based on a co-occurrence of domain words used in discovered domain names within the monitored network traffic;
   segment the discovered domain names into one or more linguistic constituent parts using natural language processing, the one or more linguistic constituent parts corresponding to human-recognizable words;
   determine sets of domain names sharing one or more common linguistic units;
   identify the suspicious domain names based on one or more characteristics selected from:
      domains sharing a common linguistic unit being a substantial proportion of domains in the monitored network traffic;
      traffic to domains sharing a common linguistic unit being a substantial proportion of traffic in the monitored network traffic;
      a set of domains sharing a common linguistic unit being an unlikely co-occurrence across a set of the one or more users; and a set of domains sharing a common linguistic unit that exhibits a relationship between linguistic units in the discovered domain names;

determine one or more features of the candidate domains; and confirm certain domains of the candidate domains as malicious domains using a parameterized classifier against the one or more features.

23. The tangible, non-transitory, computer-readable media as in claim 22, wherein the process when executed is further operable to:

determine a common linguistic unit across the discovered domain names, wherein the determined common linguistic unit is unrecognized in a segmentation dictionary; and add the determined common linguistic unit to the segmentation dictionary.

24. The tangible, non-transitory, computer-readable media as in claim 22, wherein the process when executed to determine one or more features is further operable to:

determine one or both of a number or proportion of domains sharing a common linguistic unit within the candidate domains.

25. The tangible, non-transitory, computer-readable media as in claim 22, wherein the process when executed to determine one or more features is further operable to:

determine correlated domain registration information of the candidate domains.

* * * * *